United States Patent
Lavon et al.

(10) Patent No.: US 10,739,714 B2
(45) Date of Patent: Aug. 11, 2020

(54) NULL SEGMENTS IN PRINT JOBS

(71) Applicant: HP INDIGO B.V., Amstelveen (NL)

(72) Inventors: Amiran Lavon, Ness Ziona (IL);
Michel Assenheimer, Ness Ziona (IL);
Vitaly Portnoy, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/605,569

(22) PCT Filed: Apr. 24, 2017

(86) PCT No.: PCT/EP2017/059603
§ 371 (c)(1),
(2) Date: Oct. 16, 2019

(87) PCT Pub. No.: WO2018/196944
PCT Pub. Date: Nov. 1, 2018

(65) Prior Publication Data
US 2020/0125020 A1    Apr. 23, 2020

(51) Int. Cl.
*G03G 15/00*    (2006.01)
(52) U.S. Cl.
CPC ................. *G03G 15/5012* (2013.01)
(58) Field of Classification Search
CPC ........... G03G 15/5012; G03G 15/0275; G03G 15/5008; G03G 15/602
See application file for complete search history.

(56) References Cited

U.S. PATENT DOCUMENTS

| | | | |
|---|---|---|---|
| 8,150,286 B2 | 4/2012 | Yacoub | |
| 9,535,359 B2 | 1/2017 | Sandler et al. | |
| 2011/0052293 A1 | 3/2011 | Vejtasa et al. | |
| 2011/0158712 A1 | 6/2011 | Yacoub et al. | |
| 2016/0210087 A1 | 7/2016 | Amir et al. | |
| 2017/0160666 A1* | 6/2017 | Portnoy | G03G 15/1605 |
| 2017/0212455 A1* | 7/2017 | Portnoy | G03G 15/101 |

FOREIGN PATENT DOCUMENTS

| | | |
|---|---|---|
| JP | 2004230739 | 8/2004 |
| WO | WO-2016000747 | 1/2016 |
| WO | WO-2016141990 | 9/2016 |

OTHER PUBLICATIONS

Trelleborg, Trouble Shooting Guide, Jul. 21, 2016, Available at: http://kgs.in/Uploads/News/3_27_2015_1_06_12_AMTROUBLE_SHOOTING_GUIDE.pdf >.

* cited by examiner

*Primary Examiner* — Hoang X Ngo
(74) *Attorney, Agent, or Firm* — HP Inc. Patent Department

(57) ABSTRACT

According to examples, a method comprises receiving, at a processor, print job data relating to a print job to be performed by a print apparatus, the print job data defining order in which a plurality of colour separation images are to be transferred onto an imaging surface of the print apparatus. The method may comprise determining, based on the print job data, a number of null segments to be inserted into the print job and a location at which each null segment is to be inserted amongst the plurality of colour separation images. A print apparatus and a machine-readable machine are also disclosed.

15 Claims, 6 Drawing Sheets

---

300 → Receive, at a processor, print job data relating to a print job to be performed by a print apparatus, the print job data defining order in which a plurality of colour separation images are to be transferred onto an imaging surface of the print apparatus — 302

↓

Determine, based on the print job data, a number of null segments to be inserted into the print job and a location at which each null segment is to be inserted amongst the plurality of colour separation images — 304

NULL SEGMENTS IN PRINT JOBS

BACKGROUND

In the field of printing, liquid electrophotography (LEP) technology may be implemented. LEP printing may involve the transfer of electrically-charged liquid ink via a series of rollers to a substrate.

BRIEF DESCRIPTION OF DRAWINGS

Examples will now be described, by way of non-limiting example, with reference to the accompanying drawings, in which.

DETAILED DESCRIPTION

In a liquid electrophotography (LEP) printing system, print agent, such as ink, may be stored in a cartridge and transported to a binary ink developer (BID). Each BID may be used for print agent of a particular colour, so an LEP printing system may include, for example, seven BIDs. Print agent from a BID is selectively transferred from a developer roller of the BID in a layer of substantially uniform thickness to a photoconductive surface, also referred to as an imaging surface or imaging plate. The entire photoconductive surface may be charged, then areas representing an image to be printed may be discharged. The selective transfer of print agent may then be achieved through the use of electrically-charged print agent. Print agent is transferred to those portions of the photoconductive surface that have been discharged. The photoconductive surface may transfer the print agent to an intermediate transfer member (ITM) which may be covered by a replaceable print blanket. The print agent may subsequently be transferred onto a printable substrate, such as paper, cardboard, plastics material or foil, for example. In some examples, the printable substrate may be a web substrate, such as a length of printable material stored on a roll. In other examples, the printable substrate may be a series of sheets or pages.

Figure 1:
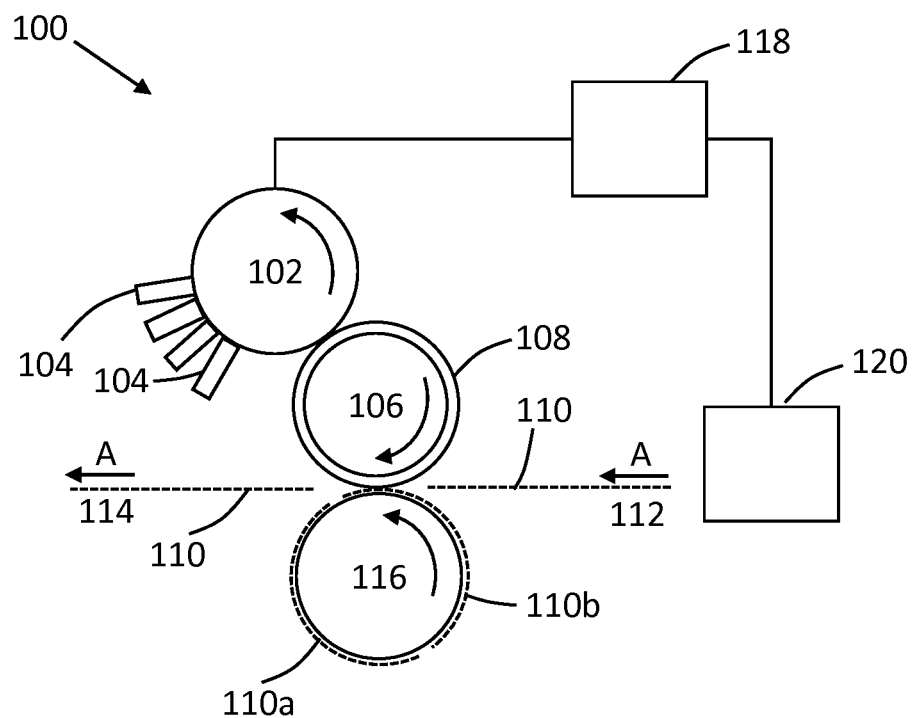
FIG. 1 is a simplified schematic of an example of print apparatus.

Referring to the drawings, FIG. 1 shows a simplified, schematic illustration of an example apparatus, such as a print apparatus 100. The print apparatus 100 may be an LEP print apparatus. The apparatus 100 includes a photoconductive surface 102. The photoconductive surface 102 may, in some examples, comprise a surface of a substantially cylindrical roller. In some examples, the photoconductive surface 102 may be formed on a drum. For example, the photoconductive surface 102 may comprise the surface of a belt. The belt may, in some examples, be positioned on or around a support, such as a roller or a drum. In the example shown in FIG. 1, the photoconductive surface is formed on a roller which rotates in the direction of the arrow. The photoconductive surface 102 comprises a surface onto which latent images may be formed, and onto which print agent may be transferred in the form of the images. Binary ink developers (BIDs) 104 are arranged around the photoconductive surface 102 and may be arranged such that a developer roller (not shown) in each BID is able to interact (i.e. transfer print agent to) the photoconductive surface. In the example shown, the print apparatus 100 includes four BIDs 104 and each BID may transfer print agent of a particular colour (e.g. cyan, magenta, yellow and black (referred to as "CMYK"). In other examples, more or fewer BIDs 104 may be included. An image formed from each colour may be referred to as a colour separation, or a colour separation image. Thus, in a CMYK image, the colours of the final image may be formed from four colour separations. The separations are transferred onto the photoconductive surface in a sequential manner. In other words, multiple colour separations are not transferred onto the photoconductive surface simultaneously.

The apparatus 100 further includes an intermediate transfer member (ITM) 106. The ITM 106 may, in some examples, comprise a substantially cylindrical roller or drum which rotates in the direction of the arrow. The ITM 106 may include a print blanket 108 which, in some examples, may be replaceable. In other words, it may be intended that an existing print blanket 108 is replaced by a new print blanket when the existing blanket becomes worn, or is otherwise unable to transfer images defect-free. The print blanket 108 may, in some examples, comprise a flexible sheet wrapped and secured around the ITM 106, so as to receive print agent from the photoconductive surface 102. After print agent is transferred onto the ITM 106 in the form of the intended image, the print agent may be transferred onto a substrate.

A printable substrate 110, such as paper, for example, is brought into contact with the ITM 106. In the example shown, the substrate 110 is fed into the print apparatus 100 as a series, or stream, of individual sheets of substrate. The substrate 100 which, in some examples, may be stored on a roll or in a ream, may be fed into the print apparatus 100 from an inlet end 112, pass through the apparatus, and exit the apparatus at an outlet end 114. The substrate, in the example shown, is fed in the direction of the arrows, A.

After the substrate 110 enters the print apparatus 100, the substrate is fed to and mounted onto a transfer roller 116 which, in some examples, may be referred to as an impression drum. The transfer roller shown in FIG. 1 rotates in the direction of the arrow. The transfer roller 116 supports the substrate 110 and may cause pressure to be applied to the substrate as it is brought into contact with the ITM 106 to receive print agent from the ITM or, where present, the print blanket 108. The transfer roller 116 may be approximately the same size (i.e. have substantially the same diameter) as the ITM 106 such that the rotational period of both the transfer roller and the ITM is approximately the same. In some examples, the photoconductive surface 102 may also have a diameter substantially the same as the diameters of the ITM 106 and the transfer roller 116.

In some examples, the transfer roller 116 may be such that two sheets of substrate 110 can be mounted onto the transfer roller at a time. In such examples, as shown in FIG. 1, a first substrate sheet 110a may be mounted onto a first side of the transfer roller and a second substrate sheet 110b may be mounted onto a second side of the transfer roller. Thus, each substrate sheet 110 may have a length approximately equal to or smaller than half of the circumference of the transfer roller 116. In other examples, the transfer roller 116 may be such that a plurality (e.g. two or more) of sheets of substrate 110 can be mounted onto the transfer roller at a time The colour separations (e.g. print agent from the BIDs 104) may be transferred in turn onto the substrate 110 via the image plate 102 and the ITM 106. For example, a first colour separation image (e.g. cyan print agent) may be transferred onto a first side of the image plate 102 as the image plate rotates relative to the BIDs 104. A second colour separation image (e.g. yellow print agent) may be transferred onto a second side of the image plate 102 as the image plate rotates relative to the BIDs 104. As the image plate 102 rotates, the first and second colour separation images may be transferred respectively onto first and second sides of the ITM 106, or into first and second positions on the print blanket 108. As the first side of the ITM 106 comes into contact with the first substrate sheet 110a on the transfer roller 116, the first colour separation may be transferred onto the substrate. The second colour separation may then be transferred onto the second substrate sheet 110b. The third and fourth colour separations may subsequently be transferred onto the image plate 102, the ITM 106 and the substrate sheets 110a, 110b. After all of the intended colour separations have been transferred onto a substrate sheet, the substrate sheet may be removed from the transfer roller 116, and fed out of the print apparatus 100 via the outlet end 114.

In some examples, it may be intended for the substrate sheets 110 to be printed (i.e. to receive print agent) on both sides (referred to a duplex printing), while in other examples, just one side of the substrate sheets may receive print agent (referred to as simplex printing). In a duplex printing job, a colour separation may be transferred onto a first side of the substrate sheet before the substrate sheet is removed from the transfer roller 116, turned over (flipped), and remounted onto the transfer roller to receive a colour separation on its second side. In some examples, some or all of the intended colour separations may be transferred onto the first side of the substrate sheet before the sheet is turned over. Thus the print apparatus 100 may include a sheet manipulation unit (not shown) to remove sheets from the transfer roller 116, flip the sheets where appropriate, and remount the sheets onto the transfer roller where appropriate.

The order in which colour separations are transferred onto the sides of the substrate sheets may be determined by a processor, such as processor 118. The processor 118 may arrange for colour separations to be transferred onto particular sides of substrate sheets in an order which provides a high, or maximum efficiency, and which maximises a productivity of the print apparatus 100. For example, rather than printing all four colour separations on a first side of a first substrate sheet before turning the substrate over to print on its second side, productivity of the print apparatus may be improved by printing a colour separation on a side of a second substrate sheet while the first sheet is being turned over. The order in which colour separations are printed, and the sides of substrate sheets onto which they are printed may depend on the number of colour separations to be printed, the intended print quality to be achieved, whether the print job is to be simplex or duplex, and/or the number of sheets to be printed.

The order in which substrate sheets 110 are printed may be controlled by a sheet ordering module 120. The sheet ordering module 120 may be in communication with the processor 118 and may receive the determined order of printing from the processor. The sheet ordering module 120 may then cause the intended sides of the substrate sheets to be printed in the intended order. The processor 118 may also be operably coupled to the photoconductive surface 102, and may cause the BIDs 104 to transfer print agent onto the photoconductive surface 102 in an intended order, and at an intended time, for example based on the determined order in which the colour separations are to be transferred onto the substrate sheets 110.

In some examples, the same image may be printed onto a large number of substrates. Thus, the same colour separations may be transferred onto the same portion of the print blanket 108 of the ITM 106 a large number of times. Repeatedly transferring the same colour separation image onto the ITM 106 in the same location a large number of times may lead to a change in properties of the print blanket 108, resulting in a representation of the image remaining on the blanket. Such so-called "image memory", which may also be referred to as "ghosting", may manifest itself as a variation in optical density, gloss level and/or dot grain in subsequent print jobs. To reduce the effects of image memory, and to maintain an intended print quality in subsequent print jobs performed by the print apparatus 100, the print apparatus may be caused to intermittently change the side or position of the photoconductive surface 102, and, hence, the ITM 106, onto which a particular colour separation is to be transferred. In other words, if during a print job, a particular (e.g. cyan) colour separation image is transferred onto a first side of the photoconductive surface 102 and the first side of the ITM 106 each time a substrate sheet is to be printed, then the print apparatus 100 may be caused to change the process at a particular time such that the cyan colour separation is instead transferred onto a second side of the photoconductive surface and a second side of the ITM for a duration. As a result, the effect of image memory may be reduced. Further, the life of the print blanket 108 and/or the photoconductive surface 102 may be extended.

The print apparatus may change the side of the ITM 106 onto which a particular colour separation is to be transferred by introducing a null segment or null cycle. The introduction of a null segment involves rotating the image plate 102, the ITM 106 and the transfer roller 116 by half a rotation (i.e. by 180 degrees) without transferring a colour separation between them, or onto the substrate. In examples in which two substrate sheets 120 are mounted onto the transfer roller 116, a half rotation of the transfer roller (and the image plate 102 and the ITM 106) will result in a colour separation which was previously to be transferred onto the first side of the ITM being transferred onto the second side of the ITM. In other examples, more (e.g. four) substrate sheets 110 may be mounted onto the transfer roller 116. In such examples, a first colour separation may be transferred onto a first portion (e.g. a quarter of the surface) of the ITM, a second colour separation may be transferred onto a second portion of the ITM, a third colour separation may be transferred onto a third portion of the ITM and a fourth colour separation may be transferred onto a fourth portion of the ITM. In this way, a single rotation of the ITM 106 (and the image plate 102 and the transfer roller 116) may result in four colour separations being transferred onto four substrate sheets 110. In this example, a null segment may involve the rotation of the rollers through a quarter of a complete rotation (i.e. through 90 degrees).

While the introduction of a single null segment is sufficient to change the position at which a particular colour separation is transferred onto the photoconductive surface 102 and the ITM 106, its introduction causes the order of printing of the substrate sheets to change. Thus, the intended order in which sides of the substrate sheets 110 are to be printed may be disrupted by the introduction of a single null segment. Thus, additional null segments may be introduced in order to cause the order of printing of the substrate sheets to be improved or maximised. In some examples, additional null segments may be introduced in order to put the order of transferring the colour separations into the order they were in before the first null segment was introduced.

Figure 2:
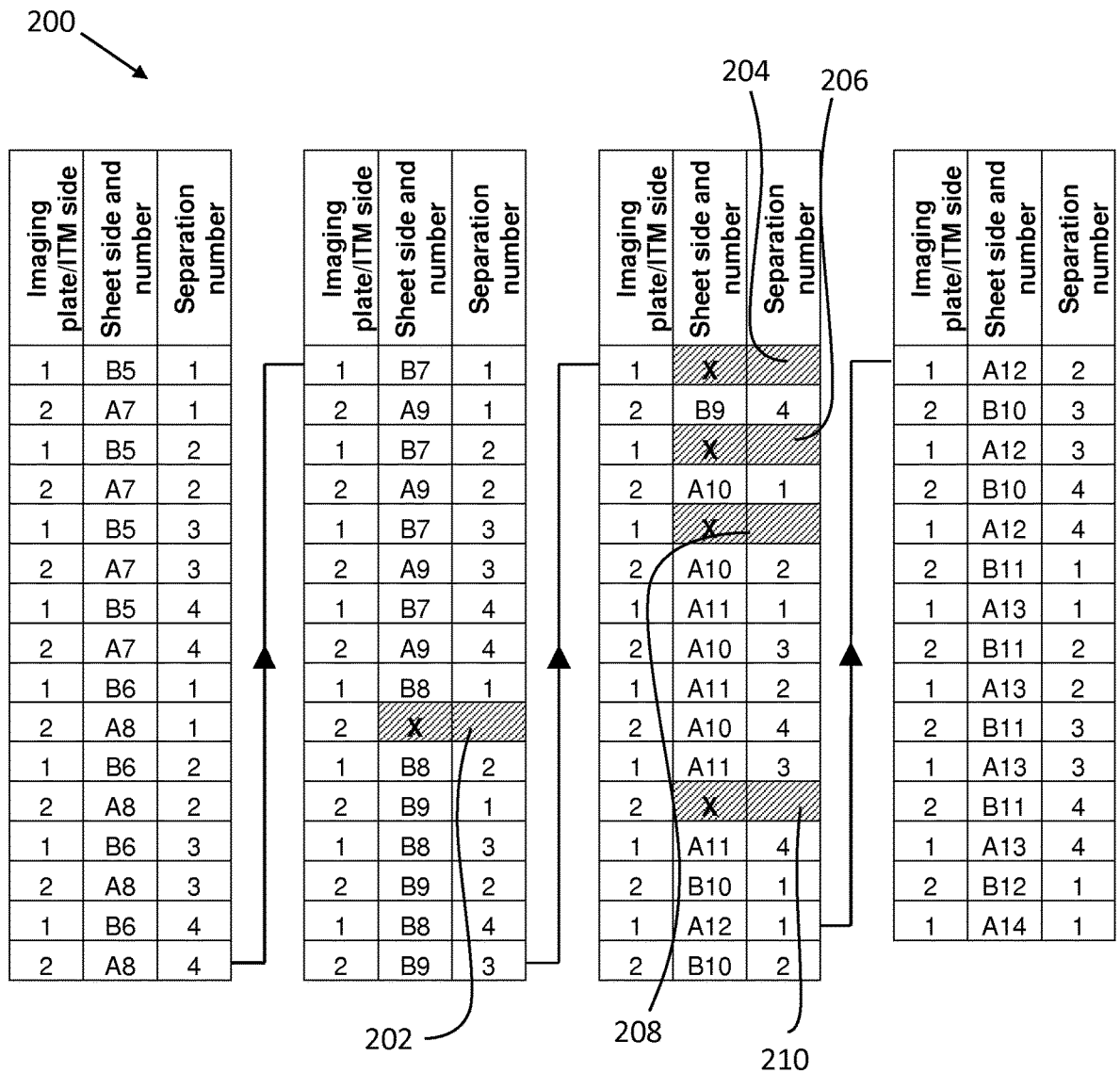
FIG. 2 is a table showing an example order in which sheets may be printed.

An example of an order in which sides of substrate sheets may be printed is shown in a table 200 in FIG. 2. The table 200 is read in the order indicated by the arrows. The "Imaging plate/ITM side" column indicates the side of the photoconductive surface 102, or the ITM 106 onto which a colour separation is to be transferred. The "Sheet side and number" column indicates the sheet number (also referred to as a sheet index) (5 to 15 in the table shown), and the side of the sheet, where A is the first side and B is the second side. The "Separation number" column indicates the number (1, 2, 3 or 4) of the colour separation (e.g. C, M, Y or K) to be transferred onto the ITM. Thus, the first row indicates that a first colour separation is to be transferred onto side 1 of the photoconductive surface and ITM, then onto the second side (B) of substrate sheet 5. Next, the first colour separation is transferred onto the second side of the photoconductive surface and ITM, then onto the first side (A) of sheet 7. Note that the first row shown in the table of FIG. 2 may not represent the first separation to be printed in the print session; the print session may start, for example, with sheet 1.

After the first separation colour has been transferred onto the first side of the photoconductive surface and ITM for transfer onto the second side of sheet 8, a first null segment 202 is introduced into the print session. In some examples, the determination to insert the first null segment 202 at this point in the print session may be made based on the number of colour separation images transferred onto the ITM at a particular position (e.g. on a particular side of the ITM drum). For example, the processor 118 of the print apparatus 100 may, in some examples, determine from print job data describing the print session, when a particular colour separation has been transferred onto the photoconductive surface and/or the ITM in the same particular position a defined number of times. Thus, the processor 118 may determine that after the defined number of occurrences, the position on the photoconductive surface and/or the ITM at which the particular colour separation is to be transferred should be changed. In some examples, a counter may be used to count the number of times that a particular colour separation image has been transferred onto the ITM in a particular position, and a null segment may be introduced when the counter reaches a defined threshold.

Following the introduction of the first null segment 202, the printing session may continue, for example with the second colour separation being transferred onto the first side of the photoconductive surface and ITM, to be transferred onto the second side of substrate sheet 8.

In order to regain the intended order in which the colour separations are transferred onto the photoconductive surface and ITM, additional null segments are introduced into the printing session. Second, third, fourth and fifth null segments 204, 206, 208, 210 are introduced into the print session at positions as indicated in the table in FIG. 2. After the introduction of the fifth null segment 210, the order in which colour separations are transferred onto the photoconductive surface and ITM is the same as the order prior to the introduction of the first null segment 202, and the side of the photoconductive surface and ITM used to transfer print agent onto the first side of each substrate sheet has switched. In this way, the intended printing order (which may have the best possible efficiency) may be achieved, thereby achieving the best possible productivity from the print apparatus 100, and reducing the likelihood of image memory or ghosting issues occurring on the ITM.

In the example shown in FIG. 2, five null segments are inserted. However, in other examples, a different number of null segments may be inserted in order to change the side of the photoconductive surface and ITM on which particular colour separations are to be transferred.

In general, a printing mode may be described in terms of the number of colour separations to be printed on each side of a substrate sheet. For example, an n/m printing mode may describe a mode in which n colour separations are to be printed on a first (recto) side of the substrate sheet, and m colour separations are to be printed on the verso side of the substrate sheet. In some examples, for any n/m printing mode, null cycles segments may be inserted in the following arrangement: (i) a first null segment at a position corresponding to a first side of the photoconductive surface/ITM; (ii) second, third and fourth null segments at positions corresponding to the second side of the photoconductive surface/ITM; (iii) a fifth null segment at a position corresponding to the first side of the photoconductive surface/ITM. The particular side/portion of the photoconductive surface onto which a colour separation is transferred is not dependent upon the side of the substrate sheet (i.e. recto or verso) onto which the colour separation is to be transferred.

A colour separation (or multiple colour separations) may be transferred onto the photoconductive surface/ITM between successive null segments. In some examples the number of colour separations to be transferred onto the photoconductive surface/ITM between successive null segments may be selected such that productivity of the printing process is kept as high as possible. In some examples, a single colour separation may be printed between the second and third null segments, and a single colour separation may be printed between the third and fourth null segments. As shown in the example of FIG. 2, the second, third and fourth null segments may be inserted consecutively at a position corresponding to a side of the photoconductive surface (e.g. the second side of the photoconductive surface in FIG. 2). In other words, a single colour separation may be transferred between the second and third null segments, and a single colour separation may be transferred between the third and fourth null segments. Multiple colour separations (e.g. six in the example of FIG. 2) may be transferred between the first and second null segments and between the fourth and fifth null segments. With such an arrangement, productivity of the printing process may be optimised.

Figure 3:
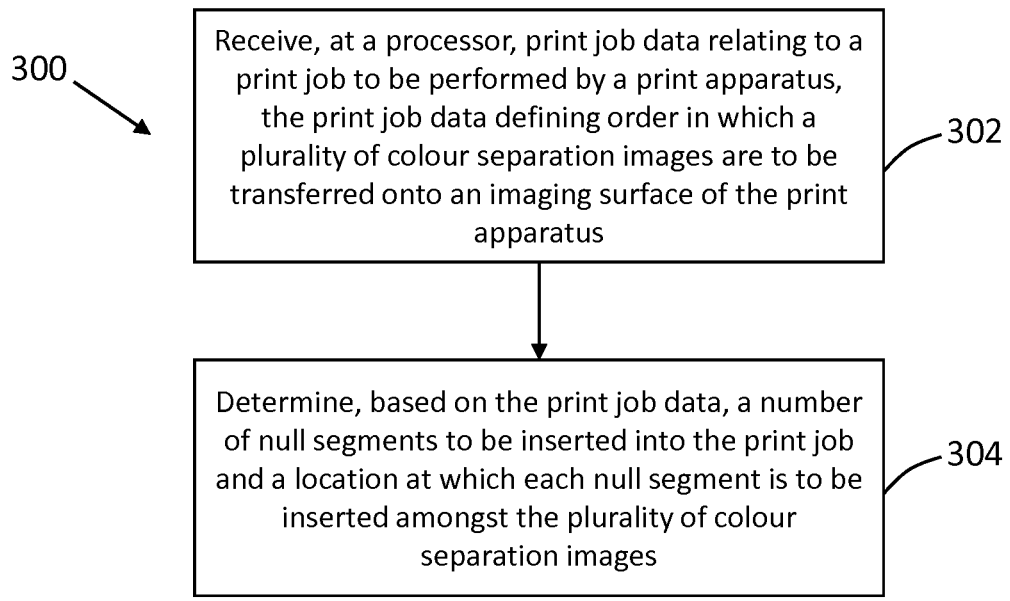
FIG. 3 is a flowchart of an example method of operating a print apparatus.

FIG. 3 is a flowchart of an example of a method 300 of operating a print apparatus, such as print apparatus 100. The method 300 may comprise, at block 302, receiving, at a processor, print job data relating to a print job to be performed by a print apparatus, the print job data defining an order in which a plurality of colour separation images are to be transferred onto an imaging surface of the print apparatus. The imaging surface may comprise a surface of the photoconductive surface 102, a surface of the ITM 106 and/or a surface of the print blanket 108. At block 304, the method comprises determining, based on the print job data, a number of null segments to be inserted into the print job and a location at which each null segment is to be inserted amongst the plurality of colour separation images.

In some examples, the processor 118 and/or the sheet order module 120 may be located in an imaging subsystem of the print apparatus 100, The processor 118 may receive print job data (for example from a computer file) and determine the number and location of null segments to be inserted in order to maintain an efficient printing session. Thus, the determination of the number and the arrangement of null segments (block 304) may be performed prior to the print session being performed. In some examples, blocks 302 and 304 of the method 300 may be performed remotely from the print apparatus 100, for example in a computing device or server.

As noted above, the number of null segments to be inserted into the print session may depend on the number of colour separations to be transferred onto each side of the substrate sheet, the number of sheets, the nature of the image to be printed (e.g. the amount and/or density of print agent to be delivered onto the substrate sheets) and/or whether the print session involves simplex or duplex printing. In some examples, the number of null segments to be inserted may be greater than one. In other examples, the number of null segments to be inserted may be five. In some examples, the print job may comprise a duplex print job. In other words, the print job may comprise transferring colour separation images onto both sides of a substrate sheet.

Figure 4:
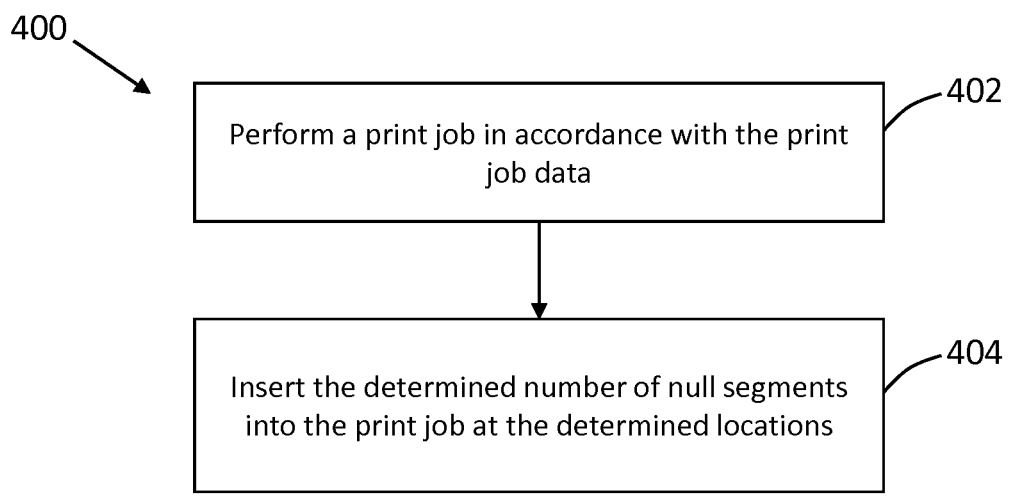
FIG. 4 is a flowchart of a further example method of operating a print apparatus.

FIG. 4 is a flowchart of an example of a further method 400 of operating a print apparatus. The method 400 may include blocks 302 and 304 described above with reference to FIG. 3. The method 400 may comprise, at block 402, performing a print job in accordance with the print job data. In other words, the print job data used in block 304 may be used at block 402 to perform a print session. At block 404, the method 400 may comprise inserting the determined number of null segments into the print job at the determined locations.

Figure 5:
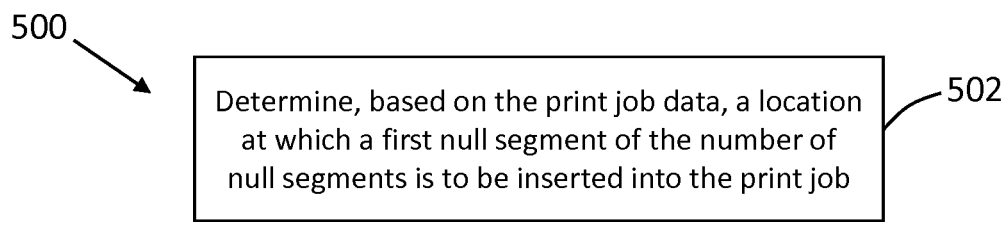
FIG. 5 is a flowchart of a further example method of operating a print apparatus.
Figure 6:
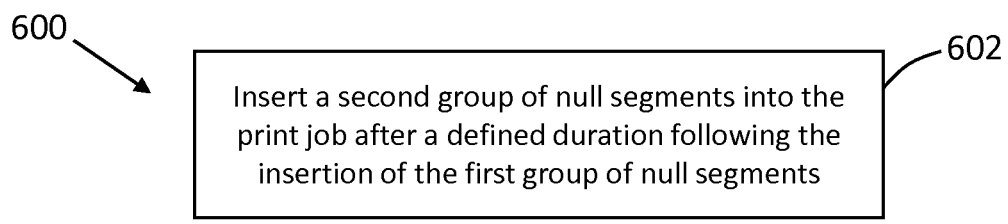
FIG. 6 is a flowchart of a further example method of operating a print apparatus.

FIGS. 5 and 6 are flowcharts of examples of further methods 500, 600 of operating a print apparatus. The method 500 and/or the method 600 may include the blocks 302 and 304 and/or the blocks 402 and 404. The method 500, as shown in FIG. 5, may comprise determining, based on the print job data, a location at which a first null segment of the number of null segments is to be inserted into the print job. In some examples, the first null segment may be inserted into the print job after a defined number of a particular colour separation image has been transferred onto the imaging surface in a particular position. For example, the first null segment may be inserted after a particular colour separation image has been transferred onto the first side of the photoconductive surface and/or the ITM drum one hundred times. In some examples, the first null segment may be inserted after a defined duration, or at a fixed position in the print session, determined based on the print job data. In other examples, the first null segment may be inserted at a time deemed to be appropriate and/or convenient based on the print job data. For example, if it is determined that the first null segment is to be inserted, but the print job is nearing completion, then it may be decided (for example by a processor) that the print job should be allowed to complete without inserting null segments.

In some examples, the determined number of null segments to be inserted into the print job may be inserted at intervals. For example, following the insertion of the fifth null segment, a further set of null segments may be inserted after a particular colour separation image has been transferred onto the photoconductive surface and/or the ITM in a particular position a defined number of times, or after a defined duration. In other words, the determined number of null segments (i.e. the number determined in block 304) may comprise a first group of null segments. The method 600, as shown in FIG. 6 may, at block 602, comprise inserting a second group of null segments into the print job after a defined duration following the insertion of the first group of null segments. In this way, the side of the photoconductive surface and/or the ITM onto which a particular colour separation image is to be transferred may be switched periodically, so that the same image is not transferred onto the photoconductive surface and/or the ITM in the same position too frequently. Thus, following the insertion of the first group of null segments, counting of the number of colour separations transferred onto the photoconductive surface and/or the ITM may be reset. The second group of null segments may be inserted after a defined number of colour separations have been transferred (e.g. 250, 500 or 1000 colour separations). Counting of the colour separation transfer numbers may also be reset if the print job is completed or terminated.

In some examples a first colour separation image of the plurality of colour separation images is to be transferred onto the imaging surface at a first position. The first position may, for example, be a first half of the imaging surface. The number of null segments to be inserted into the print job may, in some examples, be such that, following their insertion, the first colour separation image is to be transferred onto the imaging surface at a second position, different from the first position. The second position may, for example, be the second side of the imaging surface.

As noted above, the order in which print agent (the colour separations) are to be transferred onto the substrate sheets 110 is determined in order to provide an intended printing efficiency or productivity in the print apparatus 100. Thus, in some examples, the colour separation images may be transferred onto the imaging surface (and ultimately onto the substrate sheets) in a defined order. The locations at which the null segments are to be inserted into the print job may, in some examples, be such that, following their insertion, the colour separation images are to be transferred onto the imaging surface in the same defined order. For example, in FIG. 2, the order in which the colour separations are transferred prior to the insertion of the first null segment is 1, 1, 2, 2, 3, 3, 4, 4, 1, 1, 2, 2, 3, 3, 4, 4, and so on. Inserting the null segments causes the order to change. However, after insertion of the fifth null segment, the previous order is resumed. Thus, any reduction in productivity as a result of inserting the null segments may be kept to a minimum.

In some examples, five null segments may be inserted into the print job. More than five null segments may be inserted in other examples. The imaging surface may, in some examples, have a first portion and a second portion. For example, the first portion may correspond to a first side of a photoconductive surface or ITM drum, and the second portion may correspond to a second side of a photoconductive surface or ITM drum. Successive colour separations of the plurality of colour separations may be transferred alternately onto the first and second portions of the imaging surface. In some examples, a first null segment may be inserted into the print job at a position corresponding to the first portion of the imaging surface, second, third and fourth null segments may be inserted into the print job at positions corresponding to the second portion of the imaging surface, and a fifth null segment may be inserted into the print job at a position corresponding to the first portion of the imaging surface. The second, third and fourth null segments may be transferred on to the same consecutively, at a position corresponding to the same (second) portion of the imaging surface, and interleaved with colour separations transferred onto the first portion of the imaging surface. Colour separations may be transferred onto the first and second portions of the imaging surface between successive null segments. In this way, productivity of the printing process may be maintained, or maximised, while changing the position at which particular colour separations are transferred onto the photoconductive surface and ITM.

Figure 7:
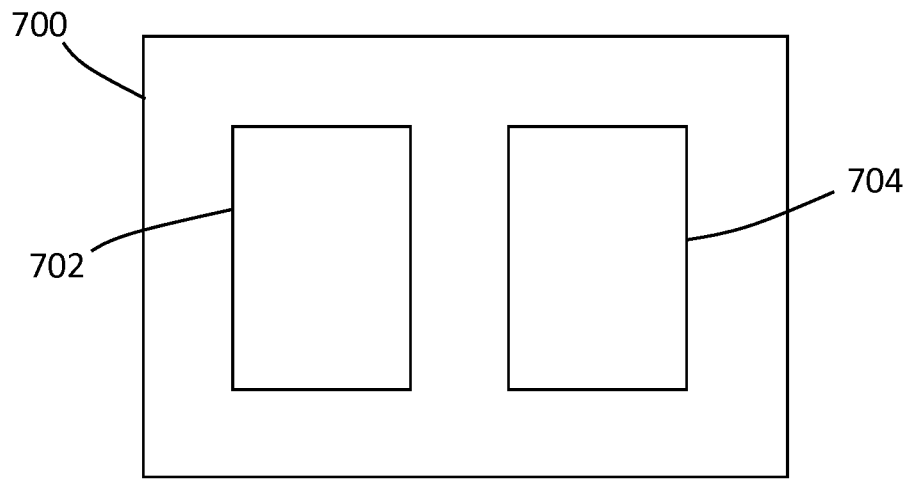
FIG. 7 is a simplified schematic of a further example of print apparatus.

FIG. 7 shows a schematic illustration of an example print apparatus 700 which may be used to perform the methods described above. The print apparatus 700 comprises an imaging surface 702 and processing circuitry 704. The imaging surface 702 may comprise the photoconductive surface 102, or a surface of an intermediate transfer member, such as the ITM 106, or a print blanket mounted thereon. The imaging surface 702 may receive a plurality of colour separations sequentially during a print session. The processing circuitry 704 may, in some examples, comprise, or be similar to, the processor 118. The processing circuitry 702 may be operable to insert a plurality of null segments into the print session, each null segment of the plurality of null segments being inserted amongst the plurality of colour separations at a defined location relative to other null segments of the plurality of null segments. Thus, the location at which each null segment is to be inserted into the print session may be defined relative to the other null segments to be inserted. In some examples, the arrangement of the null segments to be inserted into the print job may be determined, for example by the processing circuitry 704, based on details of the print session (e.g. the print job data) to be performed.

In some examples, the processing circuitry 704 may determine a number of occasions that a particular colour separation is to be delivered to a particular position on the imaging surface during a print session. Such as determination may be made from the print job data. The processing circuitry 704 may insert a first null segment of the plurality of null segments into the print session (or arrange for the first null segment to be inserted) after a particular colour separation has been delivered to a particular position on the imaging surface a defined number of times during the print session. The defined number may comprise a threshold beyond which it is intended that the position at which the colour separation is to be transferred onto the imaging surface should be changed.

In some examples, the plurality of null segments may comprise a first plurality of null segments. The processing circuitry 704 may insert a second plurality of null segments into the print session after a particular colour separation has been delivered to a particular position on the imaging surface a defined number of times following the insertion of the first plurality of null segments. In other words, after the insertion of the null segments a first time, it may be determined that additional null segments should be inserted, to cause a further change in the position at which a particular colour separation image is to be transferred onto the imaging surface. The arrangement of the second plurality of null segments (i.e. the position at which each null segment is to be inserted into the print session relative to the colour separations) may be the same as the arrangement of the first plurality of null segments. The second plurality of null segments may, in some examples, be inserted into the print session after a defined duration. The defined duration may be determined based on the print job data. In some examples, the defined duration may be based on the number of colour separations transferred onto the imaging surface.

In some examples, the imaging surface 702 may comprise a surface of an intermediate transfer member (ITM), such as the ITM 106, or a print blanket, such as the print blanket 108.

Figure 8:
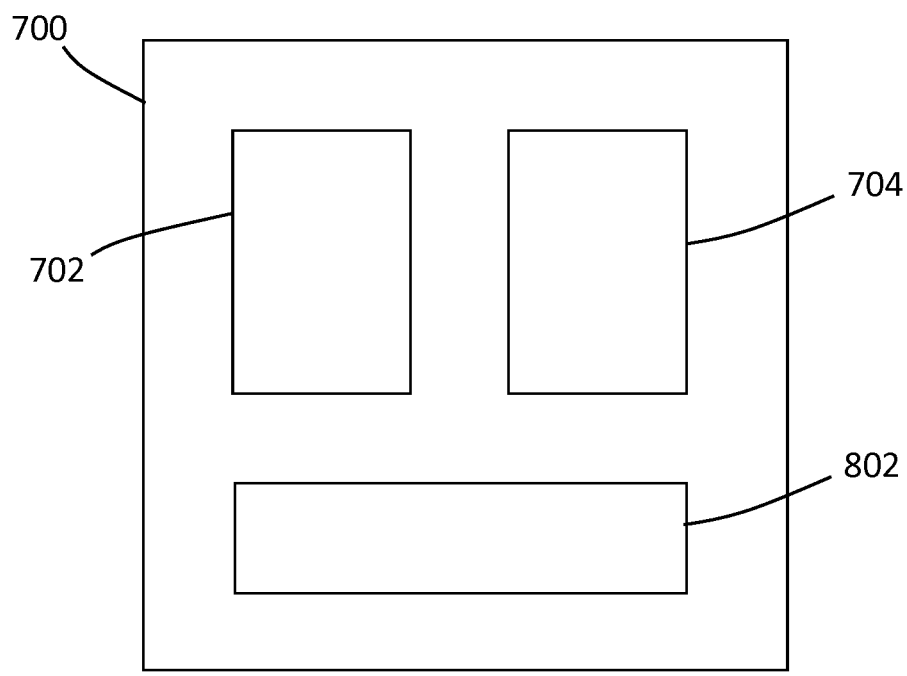
FIG. 8 is a simplified schematic of a further example of print apparatus.

FIG. 8 is a schematic illustration of a further example of the print apparatus 700. As shown in FIG. 8, the print apparatus 700 may further comprise a memory unit 802 to store a plurality of predefined relationships, each predefined relationship comprising a print mode of the print session and a corresponding quantity and arrangement of null segments to be inserted into the print session. The print mode of the print session may form part of the print job data. The print mode may include an indication of whether substrate sheets are to be printed in simplex or duplex, the number colours (i.e. colour separations) to be printed on each side of the substrate sheets, the print quality and/or the number of substrate sheets to be printed. Each print mode may have an associated order in which colour separations are to be transferred onto the substrate sheets in order to maintain an intended efficiency or productivity. Accordingly, each print mode may have an associated null segment quantity and insertion order which will cause the change of position at which a particular colour separation is to be transferred onto the photoconductive surface, with a low reduction in productivity. For example, as noted above, in an n/m printing mode, n colour separations may be printed on a first side of the substrate sheet, and m colour separations may be printed on the second side of the substrate sheet.

The plurality of predefined relationships may be stored in a database or look-up table contained within the memory unit 802. The memory unit 802 may be accessible by the processing circuitry 704. Thus, in some examples, the processing circuitry 704 may receive print job data relating to a print session to be performed by the print apparatus 700 and determine, from the print job data, the print mode to be implemented. The processing circuitry 704 may then access the predefined relationships (e.g. in a database or look-up table) in the memory unit 802 to determine the associated number of null segments to be inserted amongst the colour separations, and the order in which the null segments are to be inserted. The processing circuitry 704 may then cause the null segments to be inserted at the determined positions, for example by controlling the photoconductive surface 102, the ITM 106 and the transfer roller 116 to rotate an intended amount (e.g. a half rotation) when each null segment is to be inserted.

Figure 9:
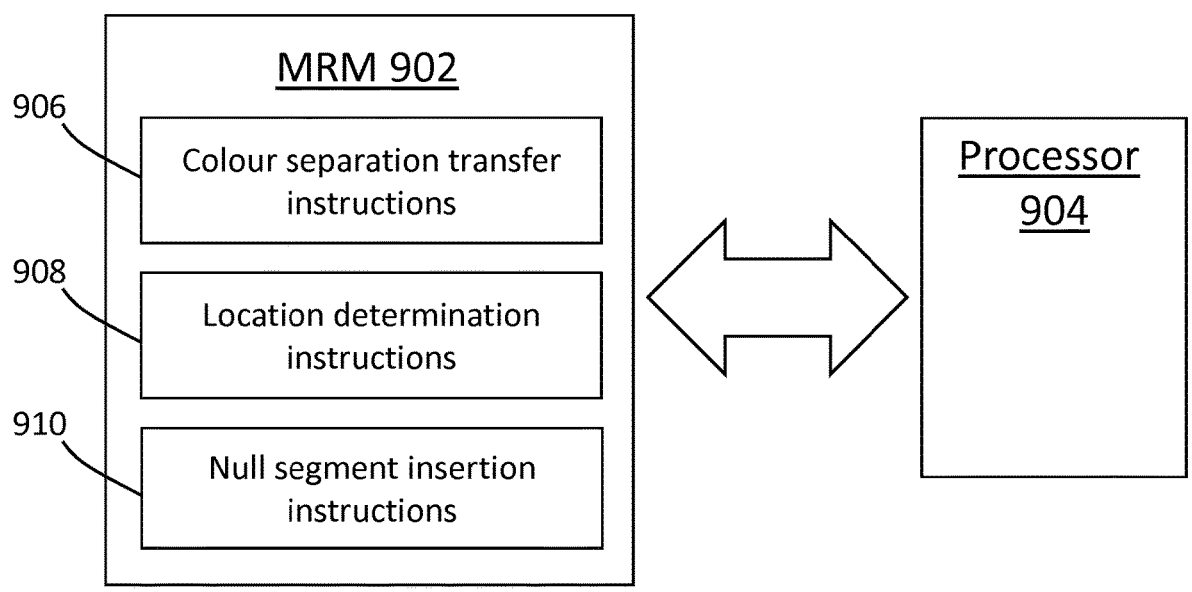
FIG. 9 is a simplified schematic of a machine-readable medium and a processor.

FIG. 9 shows, schematically, a machine-readable medium 902 and a processor 904. The machine-readable medium 902 may comprise instructions which, when executed by the processor 904, cause the processor to cause a plurality of colour separation images to be transferred sequentially onto an imaging surface of a print apparatus in accordance with print job data. For example, based on the print job data, an order in which each colour separation image is to be transferred onto the imaging surface may be determined. In some examples, causing the plurality of colour separation images to be transferred onto the imaging surface may be performed using colour separation transfer instructions 906. The machine-readable medium 902 may comprise instructions which, when executed by the processor 904, cause the processor to determine, based on the print job data, a location at which each of a first plurality of null segments is to be inserted amongst the plurality of colour separation images. In some examples, the determining of a location may be performed using location determination instructions 908. The machine-readable medium 902 may comprise instructions which, when executed by the processor 904, cause the processor to cause the first plurality of null segments to be inserted amongst the plurality of colour separation images at the determined locations. In some examples, causing the null segments to be inserted may be performed using null segment insertion instructions 910.

In some examples, the machine-readable medium 902 may comprise instructions which, when executed by the processor 904, cause the processor to cause a second plurality of null segments to be inserted amongst the plurality of colour separation images after a particular colour separation has been transferred onto the imaging surface at a particular position a defined number of times following the insertion of the first plurality of null segments. In some examples, the colour separation images are to be transferred onto the imaging surface in a defined order. For example, the order may be selected to maximise printing efficiency, or productivity of the print apparatus. In some examples, the locations at which the null segments are to be inserted amongst the plurality of colour separation images are such that, following their insertion, the colour separation images are to be transferred onto the imaging surface in the same defined order. In other words, the null segments may be inserted at positions which maintain the efficiency and/or productivity of the print apparatus by enabling the colour separations to be transferred onto the imaging surface (and, therefore, onto the substrate sheets) in the intended order.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method, comprising:
   receiving, at a processor, print job data relating to a print job to be performed by a print apparatus, the print job data defining an order in which a plurality of colour separation images are to be transferred onto an imaging surface of the print apparatus; and
   determining, based on the print job data, a number of null segments to be inserted into the print job and a location at which each null segment is to be inserted amongst the plurality of colour separation images.

2. A method according to claim 1, wherein the number of null segments is greater than one.

3. A method according to claim 1, further comprising:
   performing a print job in accordance with the print job data; and
   inserting the determined number of null segments into the print job at the determined locations.

4. A method according to claim 3, wherein the determined number of null segments comprises a first group of null segments, and the method further comprises:
   inserting a second group of null segments into the print job after a defined duration following the insertion of the first group of null segments.

5. A method according to claim 1, further comprising:
   determining, based on the print job data, a location at which a first null segment of the number of null segments is to be inserted into the print job;
   wherein the first null segment is to be inserted into the print job after a defined number of a particular colour separation image has been transferred onto the imaging surface in a particular position.

6. A method according to claim 1, wherein a first colour separation image of the plurality of colour separation images is to be transferred onto the imaging surface at a first position; and wherein the number of null segments to be inserted into the print job is such that, following their insertion, the first colour separation image is to be transferred onto the imaging surface at a second position, different from the first position.

7. A method according to claim 1, wherein the imaging surface has a first portion and a second portion, and successive colour separations of the plurality of colour separations are to be transferred alternately onto the first and second portions of the imaging surface;
wherein a first null segment is to be inserted into the print job at a position corresponding to the first portion of the imaging surface;
wherein second, third and fourth null segments are to be inserted into the print job at positions corresponding to the second portion of the imaging surface; and
wherein a fifth null segment is to be inserted into the print job at a position corresponding to the first portion of the imaging surface.

8. A method according to claim 7, wherein the second, third and fourth null segments are to be inserted consecutively at positions corresponding to the second portion of the imaging surface.

9. Print apparatus, comprising:
an imaging surface to receive a plurality of colour separations sequentially during a print session;
processing circuitry to:
insert a plurality of null segments into the print session, each null segment of the plurality of null segments being inserted amongst the plurality of colour separations at a defined location relative to other null segments of the plurality of null segments.

10. Print apparatus according to claim 9, wherein the plurality of null segments comprises a first plurality of null segments, and
wherein the processing circuitry is to:
insert a second plurality of null segments into the print session after a particular colour separation has been delivered to a particular position on the imaging surface a defined number of times following the insertion of the first plurality of null segments.

11. Print apparatus according to claim 9, wherein the imaging surface comprises a surface of an intermediate transfer member, ITM, or a print blanket.

12. Print apparatus according to claim 9, further comprising:
a memory unit to store a plurality of predefined relationships, each predefined relationship comprising a print mode of the print session and a corresponding quantity and arrangement of null segments to be inserted into the print session.

13. Print apparatus according to claim 9, wherein the processing circuitry is to:
determine a number of occasions that a particular colour separation is to be delivered to a particular position on the imaging surface during a print session;
insert a first null segment of the plurality of null segments into the print session after a particular colour separation has been delivered to a particular position on the imaging surface a defined number of times during the print session.

14. A machine-readable medium comprising instructions which, when executed by a processor, cause the processor to:
cause a plurality of colour separation images to be transferred sequentially onto an imaging surface of a print apparatus in accordance with print job data;
determine, based on the print job data, a location at which each of a first plurality of null segments is to be inserted amongst the plurality of colour separation images; and
cause the first plurality of null segments to be inserted amongst the plurality of colour separation images at the determined locations.

15. A machine-readable medium according to claim 14, comprising instructions which, when executed by a processor, cause the processor to:
cause a second plurality of null segments to be inserted amongst the plurality of colour separation images after a particular colour separation has been transferred onto the imaging surface at a particular position a defined number of times following the insertion of the first plurality of null segments.

* * * * *